T. L. NYBLOM.
WEIGHING APPARATUS.
APPLICATION FILED FEB. 14, 1917.

1,312,132.

Patented Aug. 5, 1919.
3 SHEETS—SHEET 1.

Fig. 1.

Inventor
Ture Lennart Nyblom

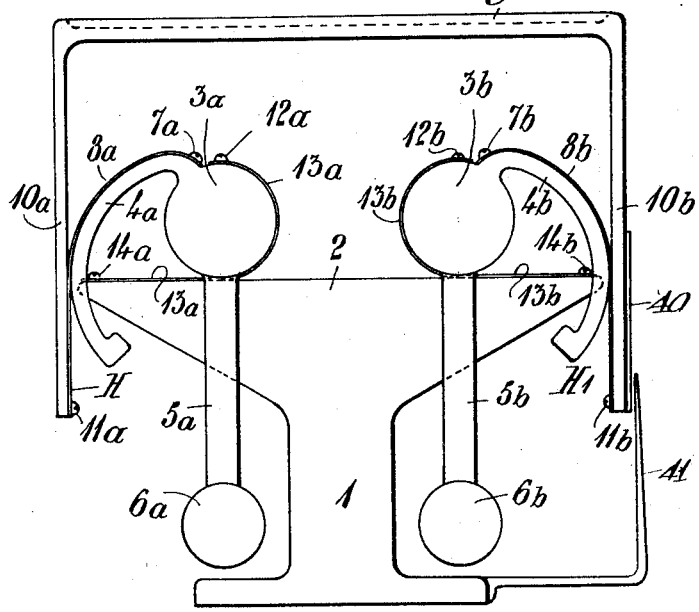
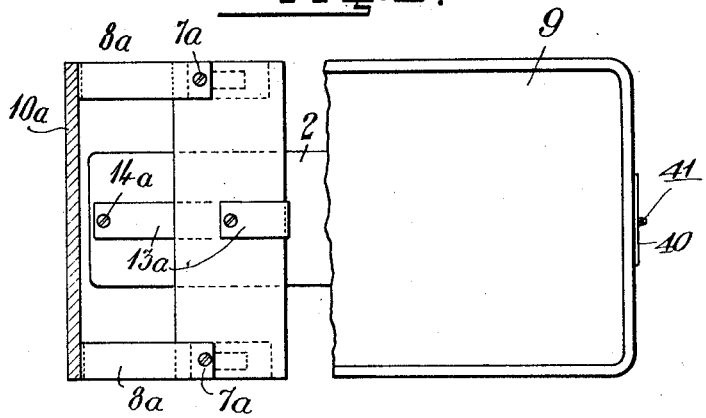
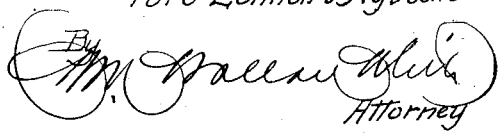

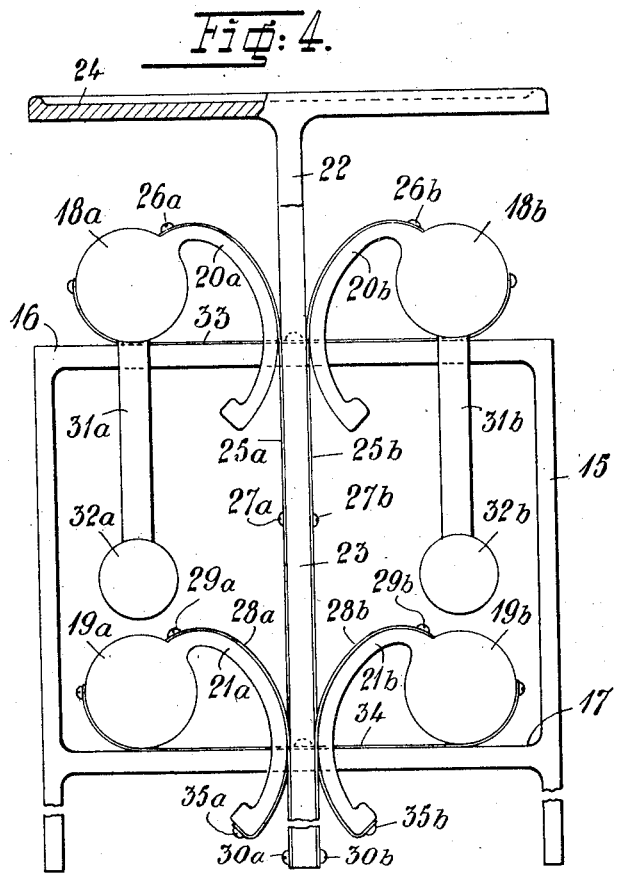
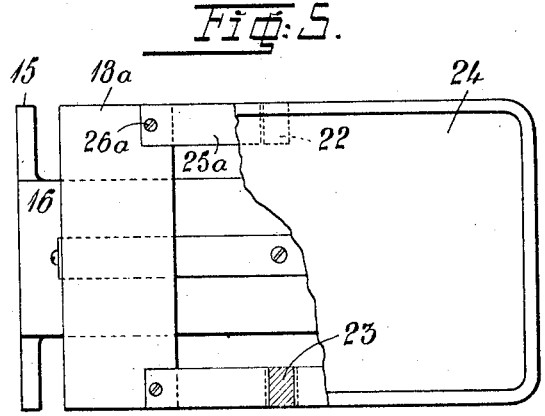

UNITED STATES PATENT OFFICE.

TURE LENNART NYBLOM, OF SATTSJÖ-STORÄNGEN, SWEDEN.

WEIGHING APPARATUS.

1,312,132.          Specification of Letters Patent.        Patented Aug. 5, 1919.

Application filed February 14, 1917. Serial No. 148,692.

*To all whom it may concern:*

Be it known that I, TURE LENNART NYBLOM, a subject of the King of Sweden, residing at Sattsjö-Storängen, Sweden, have invented new and useful Improvements in Weighing Apparatus, of which the following is a specification.

The present invention has for its object a very simple and practicable construction of such edgeless weighing apparatus in which the object to be weighed acts upon a lever of a counter-balanced body, rolling along a horizontal or almost horizontal plane, this action being effected by means of a flexible strip or the like, which during the weighing operation is wound upon or unwound from the lever. The invention is characterized thereby, that that surface of the said lever, which coöperates with the strip, constitutes the involute of the rolling body, the circumference of which may be of any suitable curved form.

In the accompanying drawings some constructional forms of this weighing apparatus are illustrated.

Figure 1 is a schematic view, illustrating the principle of the weighing apparatus, Figs. 2 and 3 illustrate respectively a side view and a plan view, partly in section of one constructional form and Figs. 4 and 5 are corresponding views of a second constructional form.

In Fig. 1 A B C is a curve line and A D E the involute of the said line A B C, which thus is the evolute of the line A D E. The said evolute rests upon a horizontal plane F D G, along which it can roll, whereby the distance between the supporting point B of the evolute upon the plane F D G and the point D, in which the involute crosses the plane, always will become equal to the length of the evolute-line between the supporting point B and the point A, common to the involute and to the evolute. During the rolling motion of the evolute on the plane F D G, this plane always will be crossed by the involute in the same point D and furthermore the involute always will become perpendicular to the plane in this point D.

When now another lever K with a counter-balance L is fixed in the point C and a flexible strip H provided with a scale I is fixed in the point A, the counter-balance L at the rolling of the evolute will be turned in different angles at different loading of the scale I, whereby the flexible strip becomes resting against the involute A D E with a greater or less part of its length. The contact between the strip and the involute always ceases in the point D. For reading off the weight a suitable graduation is arranged for instance upon the involute, which graduation can be read off by means of the horizontal plane.

In the constructional form according to Figs. 2–3, 1 is a support provided with a horizontal plane or track 2, supporting two cylinders (circle-evolutes) $3^a$ and $3^b$ of the same diameter. These cylinders are provided with two congruous but reversed levers $4^a$ and $4^b$, on the outer surfaces formed as involutes of the cylinders. At the cylinders $3^a$ and $3^b$ are fixed the levers $5^a$, $5^b$ with the weights $6^a$ and $6^b$. $7^a$ and $7^b$ are screws by means of which the flexible strips $8^a$ and $8^b$ for instance of steel are fixed to the involutes $4^a$ and $4^b$ and in these strips the weighing bridge 9 is mounted by means of the guides $10^a$ and $10^b$ and the screws $11^a$ and $11^b$. Because the involute surfaces act upon the guides $10^a$ and $10^b$ indirectly by the interposed strips the cylinders $3^a$ and $3^b$ cannot be displaced outward. For preventing their displacing in the opposite direction (against each other) the cylinders are connected to the horizontal plane 2 by means of the screws $12^a$ and $12^b$, the strips $13^a$ and $13^b$ and the screws $14^a$ and $14^b$.

When an object is placed upon the bridge 9 this bridge is lowered, whereby the cylinders $3^a$ and $3^b$ roll outward along the plane 2, and the levers $5^a$, $5^b$ and their weights $6^a$, $6^b$ are turned upward, until balance is reached. By a suitable graduation for instance, a scale 40 on the guide $10^b$ of the weighing bridge 9 and an arm or pointer 41 fixed at the support 1 the weight of the object upon the bridge can be read off in a simple and easy manner.

In the constructional form according to Figs. 4 and 5 15 is a support with two planes or tracks 16 and 17. Upon the upper one of these planes two cylinders $18^a$ and $18^b$ (the circle evolutes) are rolling and the cylinders $19^a$ and $19^b$ are rolling upon the lower plane, whereby all the cylinders are provided with levers $20^a$, $20^b$ and $21^a$, $21^b$, formed as circle involutes on their outer surfaces. Between these involutes two vertical supporting rods 22 and 23 for the weighing bridge 24 are mounted. These rods and the bridge are supported as well by the strips 25ª and 25ᵇ, fixed at the levers 20ª and 20ᵇ, by means of screws 26ª and 26ᵇ and at the rods 22, 23 by means of the screws 27ª, 27ᵇ as by the strips 28ª, 28ᵇ fixed at the levers 21ª, 21ᵇ and the rods 22, 23 by means of screws 29ª, 29ᵇ resp. 30ª, 30ᵇ. The cylinders 18ª and 18ᵇ support the rods 31ª, 31ᵇ and their weights 32ª, 32ᵇ which, when the bridge is loaded, are turned until balance is reached. For preventing any slipping of the evolutes on the planes 16, 17 the evolutes are connected to the said planes by means of flexible strips 33 and 34 as previously described relating to the construction illustrated in Figs. 2—3.

By uneven loading of the bridge 24 this latter on account of this arrangement cannot get an awry position, because it is resting against one of the upper involute-levers and also against the opposite lower involute lever, thus the lower involute levers and their cylinders only having for their function to guide the bridge. For removing the lower involute levers 21ª, 21ᵇ to their original position, when the bridge is discharged, the strips 25ª, 25ᵇ may be extended downward and fixed to the levers 21ª, 21ᵇ by means of screws 35ª, 35ᵇ as shown in Fig. 4.

Having now particularly described the nature of my invention and the manner of its operation, what I claim is:

1. A weighing apparatus comprising a support having a surface disposed in a horizontal plane, members movable on said surface and biased to one position, a platform mounted for rectilinear movement, and flexible strips connecting said platform and said members and said support and said members for imparting oscillatory movement to said members in opposite directions when said platform is subjected to pressure.

2. A weighing apparatus comprising a support having a plurality of superposed surfaces disposed in horizontal planes, a platform, supporting rods secured to said platform and extending into said support, biased members movable over the upper sides of said surfaces and disposed upon opposite sides of said rods, and flexible means connecting said members with said rods and said surfaces.

3. A weighing apparatus comprising a support having a plurality of superposed surfaces disposed in horizontal planes, a member movable over the upper sides of each of said surfaces and biased to one position, a platform, a supporting rod secured to the platform, an arcuate lever formed on each of said members and disposed eccentrically thereof, flexible members connected to said rod and said levers, and second flexible members connecting said members and said support.

4. A weighing apparatus comprising a horizontal fixed plane, a plurality of rolling bodies on the plane, a lever and a weighted lever both firmly fixed to each body, said levers constituting the involute of the rolling bodies, a flexible strip secured to and arranged along the surface of each involute lever, a weighing bridge connected to all of said strips, a second horizontal fixed plane, a plurality of rolling bodies on the second plane, a lever fixed on each rolling body on the second fixed plane and constituting the involute of each rolling body, flexible strips connected to said involute levers and to said weighing bridge for giving stability and guidance to the latter.

In testimony whereof I have signed my name to this specification in the presence of two subscribing witnesses.

TURE LENNART NYBLOM.

Witnesses:
ADA SIMON,
HARRY HAMMAR.